Nov. 26, 1940.  D. G. STRACHAN  2,222,960
KITCHEN APPLIANCE
Filed May 26, 1939
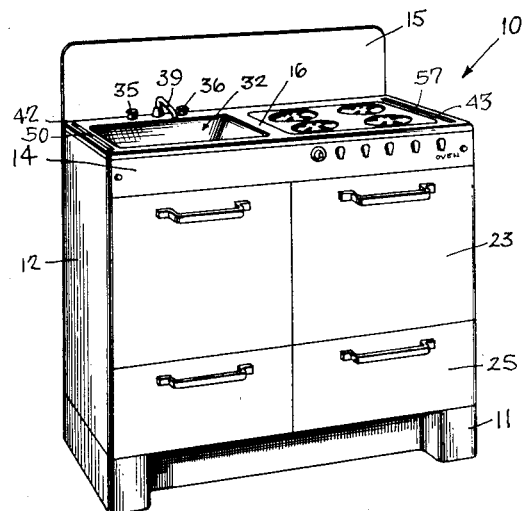
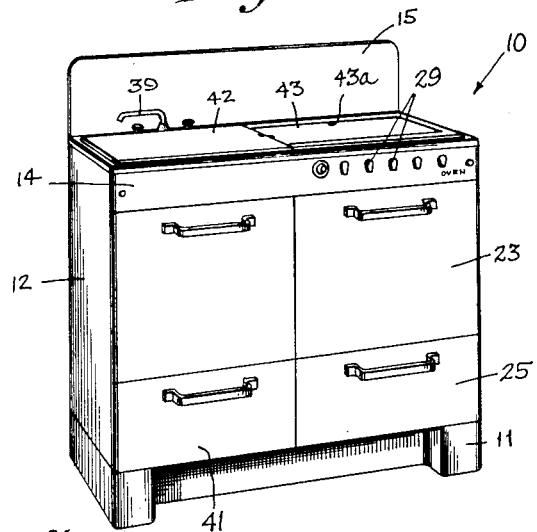
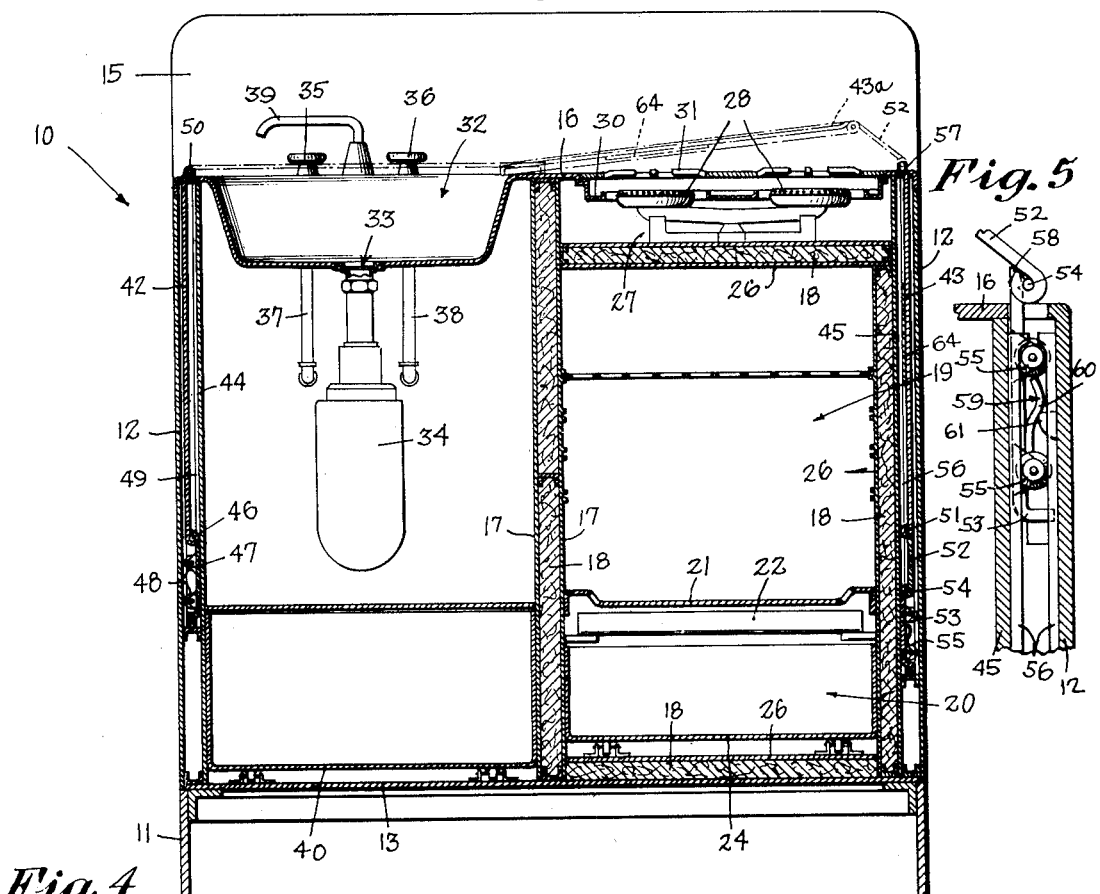
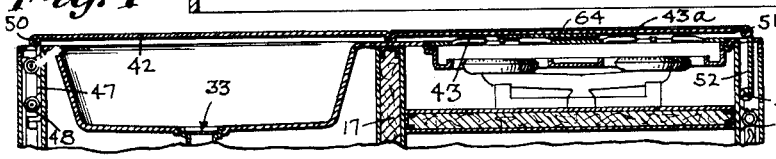
INVENTOR
Donald G. Strachan
BY Johnson, Klein & Smyth
ATTORNEYS Patented Nov. 26, 1940

2,222,960

UNITED STATES PATENT OFFICE 2,222,960

KITCHEN APPLIANCE

Donald G. Strachan, Bridgeport, Conn.

Application May 26, 1939, Serial No. 275,835

17 Claims. (Cl. 312—169)

This invention relates to kitchen appliances.

The object of the present invention is to provide an efficient single kitchen appliance which provides the facilities now provided by several appliances or articles of kitchen furniture.

The appliance is primarily adapted for use in small kitchens or kitchenettes where floor space is limited, as in apartment dwellings or small houses.

A feature of the present invention is the arrangement or disposition of practically all the equipment necessary in a kitchen within a single cabinet which renders the conjoint or successive use of several facilities more convenient than present day kitchen arrangements.

The appliance comprises a cabinet which, in addition to providing cooking, cleaning and other related kitchen facilities, is compact and pleasing in design.

Other features and advantages will hereinafter appear.

In the broader aspects of the invention, the cabinet houses a stove unit providing complete cooking facilities and a sink supplied with water-supply connections and a drain adapted to be connected to the conventional waste disposal pipe.

The stove may be either electric or gas and if installation requirements make it necessary, the stove may be an oil unit in which case a suitable receptacle for the oil may be also housed within the cabinet.

The cabinet is provided with pivotally mounted panels which can be slid into suitable openings formed adjacent the side or end walls of the cabinet or withdrawn from the cabinet and moved to overlie the sink and burner grate of the stove.

The cabinet with the panels overlying the sink and burner grate of the stove can be used as a table, for the panels in this position provide a plane surface which makes an excellent work surface.

The panel which is adapted to overlie the burner grate of the stove may be so arranged, by a slight adjustment, that the end adjacent the side wall of the cabinet will be disposed at a higher level than the opposite end which in this position projects over the edge of the sink. This panel can then be used as a drainboard for the sink, and, as it has one end thereof elevated, will carry away water or the like from articles deposited on the board to the sink. The panel overlying the sink in this use of the appliance is in its retracted position within the cabinet.

The panel, which in one position serves as a drainboard for the sink, may also be employed without adjustment as a drier for cooking utensils or the like by igniting the burner directly below a metal pad carried by the undersurface of the panel, which pad distributes the heat from the burner evenly over the undersurface of the panel, thereby warming the same and setting up heated air currents which dry the utensils or the like supported by the panel.

When it is desired to use the top burners of the stove for cooking purposes, the drain panel may be retracted and the other panel withdrawn from the cabinet and pivotally moved to its position overlying the sink. In this use of the appliance, the same very closely resembles the present day stoves which have been aptly termed "table top ranges." Both the panels, if desired, can be retracted, exposing both the sink and the stove for use conjointly if desired.

The cabinet may be provided with storage space for cooking utensils or the like and also may be provided with a garbage disposal unit adapted to be connected to the waste disposal pipe of the sink.

In the accompanying drawing:

Figure 1 is a perspective view of the appliance of the present invention with the panels concealed within the cabinet.

Fig. 2 is a view similar to Fig. 1, but showing the two panels withdrawn from their concealed position within the cabinet and overlying the sink and stove.

Fig. 3 is a longitudinal sectional view of the appliance with the panels shown in full lines in their concealed position and in broken lines in their position when withdrawn from the cabinet, the panel overlying the burner being shown in the position wherein it is used as a drainboard for the sink.

Fig. 4 is a fragmentary sectional view showing the panels in their position when the appliance is used as a worktable.

Fig. 5 is a fragmentary sectional view, partly in elevation, showing the carriage and link connecting the panel and the locking means operative to hold the panel elevated when the same is used as a drainboard for the sink.

The preferred embodiment of the present invention comprises a cabinet 10 supported by a base portion 11. The cabinet includes a frame having side walls 12, a bottom wall 13, a front wall 14 and a rear wall 15 which rises above a top wall 16. The wall members are suitably connected by any conventional means to form a rigid structure.

The cabinet is divided into two compartments by a pair of spaced sheet metal vertical walls 17 separated by insulated material 18. One of the compartments so formed may house a bake oven 19 and a broiler oven 20.

To prevent the rapid dissipation of the heat generated and supplied the oven compartments, the walls of the oven compartments are provided with sheet metal linings 26 spaced inwardly of the same and insulating material similar to insulating material 18 is inserted between these linings and the walls forming the oven spaces.

Located above the bake ovens is a burner box 27 provided with a plurality of burners 28. The burners are supported on the top of the oven compartment. These burners, as is the oven burner, are controlled by valves 29 mounted for convenient operation on the exterior face of the front wall of the cabinet. Mounted below the burners is the usual drip pan 30. A burner top or grate 31 is supported so as to overlie the burners, and, as in the conventional stoves, affords a support for culinary vessels.

In the embodiment of the invention shown in the drawing, the stove has been illustrated as a gas stove, although it will be apparent that the stove may be of any type desired. The burners illustrated might comprise, for example, suitable resistance elements which can be energized by a source of current which could be controlled by suitable switches mounted in the same position as the valves 29. In some localities, where neither gas nor electricity is available, the burners of the oven and burner box may be of the type used for oil, and, if the burners were operated by oil, a receptacle for the same could be provided for within the cabinet.

The drip pan 30 and the grate 31 are both supported on a depressed ledge provided along the edge of an aperture in the top wall of the cabinet, said aperture being disposed above the burner assembly. The top wall of the cabinet, as shown, is provided with a substantially large recessed portion 32 directly above the remaining compartment. The recess 32, as will be seen, forms a basin or sink. The sink is provided with a drain outlet 33 which may be connected through a garbage disposal unit 34 to the conventional waste disposal pipe or plumbing of the dwelling.

To afford a convenient supply of water adjacent the sink, water-supply connections are mounted on the top wall of the panel to the rear of the sink. These connections include faucets 35 and 36 connected to hot and cold water pipes 37 and 38, respectively, carried by the cabinet which in turn, as will be understood, are to be connected to the conventional hot and cold water-supply pipes of the dwelling. The water is discharged into the sink through a swivel spout 39 mounted intermediate the faucets 35 and 36 to the rear of the sink.

The space immediately below the sink may be used as a storage compartment if desired for culinary vessels and the like.

It will be seen that the appliance affords complete cooking and cleaning facilities generally provided for by two appliances in a kitchen. The cooking and cleaning facilities provided by the appliance of the present invention may be, as can be readily understood, successively or conjointly used.

To permit the cabinet to be used as a worktable, as shown in Fig. 2, I have provided panels slidably mounted within the cabinet so as to be concealed therein when not in use. The panels may be easily and conveniently withdrawn from the cabinet and moved to the position shown in Fig. 2 when it is desired to use the appliance as a worktable. The panels 42 and 43, as shown, are mounted for sliding movement between the side walls of the cabinet and inwardly spaced partitions 44 and 45, respectively, coextensive with the side walls 12.

The particular arrangement and disposition of the panels within the cabinet, in relation to the sink and stove, can be changed if desired; however, the specific construction as shown represents the preferred arrangement thereof.

The panel 42 is pivotally connected as at 46 to a carriage 47 provided with a plurality of small wheels or rollers 48 which run in a suitable trackway 49 formed on the adjacent faces of the wall 12 and partition 44. The panel 42 may be moved from its concealed position shown in heavy lines in Fig. 3, to its position, as shown in dotted lines by simply grasping the small knob or handle 50 formed at the upper edge thereof and pulling the panel upward to a substantially vertical position to expose the pivotal connection 46, whereupon the panel may be pivotally moved downward to overlie the sink. The swivel spout can be pivotally moved to a position substantially parallel to the rear wall 15 and in this position, as it is mounted to the rear of the sink, will not interfere with the movement of the panel to its horizontal position overlying the sink.

In this application of the appliance with the panel 42 now overlying the sink, the same may be used as a stove and worktable, as in this application it very closely resembles the conventional so-called "table top range."

The panel 43 is connected by means of a suitable pivot 51 to a link bar 52 which in turn is pivotally connected to a carriage 53 at 54. The carriage 53 is provided with suitable small wheels or rollers 55 which operate or run in a trackway 56 provided on the adjacent faces of the side wall 12 and the partition 45. The panel 43 may be moved from the position shown in heavy lines in Fig. 3 to that shown in Fig. 2 by simply grasping the small handle 57 formed at the upper edge thereof and pulling the same upward until the pivotal connection 51 is exposed and then moving the panel downward to a position overlying the burner box. The handles 50 and 57 are respectively disposed along the edges of the panels 42 and 43 on opposite sides of the center point of said edges, as shown in Fig. 2, in such a manner that the handles will not coincide when both panels are withdrawn from the cabinet and are horizontally positioned to cover both the sink and the stove. Panel 42 is provided with an indentation or recess corresponding in position and contour to the handle 57 and panel 43 with a similar recess corresponding to handle 50 so that the handles will not prevent the two panels from lying horizontally on the top surface of the cabinet at the same time as shown in Fig. 2. With both panels withdrawn from the cabinet, the appliance presents a relatively large table top affording ample space for the preparation of meals and other kitchen duties.

As has been pointed out hereinbefore, the appliance may be conjointly used as a stove and a sink as well as a stove and table, and, as has just been pointed out, the appliance may be used solely as a table.

When it is desired to use the appliance solely as a sink, panel 43 may be moved to the position burner assembly in an angular position relative to the top of said cabinet and forming in said position a drainboard for the sink.

4. An appliance of the type described forming a unitary article of furniture and including in combination a cabinet; a sink supported in the upper and side portion thereof; a burner assembly including a plurality of spaced burners supported in the upper opposite side portion of said cabinet; a horizontal table portion covering the sink and burner assembly, said table portion comprising a pair of independently movable panels mounted for combined pivotal and sliding movement relative to said cabinet; means for independently moving the panels pivotally from horizontal to vertical positions at opposite ends of said cabinet and then slidably into apertures formed in the top wall of the cabinet so as to be concealed within said cabinet when not in use; and means for adjusting the panel covering said burner assembly in an angular position relative to the top of said cabinet and forming in said position a drainboard for the sink.

5. An appliance of the type described forming a unitary article of furniture and including in combination a cabinet; a sink supported in the upper and side portion thereof; a burner assembly including a plurality of spaced burners supported in the upper opposite side portion of said cabinet; a horizontal table portion covering the sink and burner assembly, said table portion comprising a pair of independently movable panels mounted for combined pivotal and sliding movement relative to said cabinet, the panels being pivotally movable independently from horizontal to vertical positions at opposite ends of said cabinet and then slidable into apertures formed in the top wall of the cabinet so as to be concealed within said cabinet when not in use, the panel covering said burner assembly being movable to an angular position relative to the top of said cabinet and forming in said position a drainboard for the sink; retractable means for supporting said panel in the said angular position; and means carried by the underside of said panel for distributing heat from one of said burners over the undersurface of the same whereby cooking utensils and the like supported on said panel will be heated and dried.

6. An appliance of the type described forming a unitary article of furniture and including in combination a cabinet; a sink supported in the upper and side portion thereof; a burner assembly including a plurality of spaced burners supported in the upper opposite side portion of said cabinet; a horizontal table portion covering the sink and burner assembly, said table portion comprising a pair of independently movable panels mounted for combined pivotal and sliding movement relative to said cabinet, the panels being pivotally movable independently from horizontal to vertical positions at opposite ends of said cabinet and then slidable into apertures formed in the top wall of the cabinet so as to be concealed within said cabinet when not in use, the panel covering said burner assembly being movable to an angular position relative to the top of said cabinet and forming in said position a drainboard for the sink; and retractable means for supporting said panel in the said angular position, said panel being adapted to be heated by the ignition of one of said burners whereby convection currents rising from the same will pass around and dry cooking utensils and the like supported by the panel.

7. In a kitchen appliance having water-supply means thereon, a frame; a sink and a stove arranged side by side on the frame and in substantially the same horizontal plane, said sink being positioned to cooperate with the water-supply means, means carried by the frame for supplying a heating medium to the stove; a pair of table top sections one located at each side of the frame and each slidably mounted on the frame for movement upward and pivotally downwardly and inwardly of the frame to horizontal positions covering respectively the sink and top of the stove and constituting a worktable top, said table top section covering the sink terminating short of said water supply means so that the panel may be brought into operative position without interference therefrom and means for further adjusting the table top section covering the stove so that the outer edge thereof is disposed at a higher level than the inner edge, said table top section serving in this adjusted position as a drainboard for the sink.

8. In an appliance of the type described forming a unitary article of furniture having water-supply means thereon and including a frame; a top wall for said frame; a sink and stove supported on said top wall in juxtaposed position and in substantially the same horizontal plane, said sink being positioned to cooperate with the water-supply means; means carried by the frame for supplying a heating medium to the stove; a table portion covering the sink and burner assembly, said table portion comprising a pair of independently movable panels slidably mounted within said frame; means for moving said panels from an exposed vertical position when slidably withdrawn from the frame to a horizontal position overlying respectively the sink and stove, and means for adjusting the panel overlying said stove so that the outer edge thereof is disposed at a higher lever than the inner edge, said panel serving in this adjusted position as a drainboard for the sink.

9. In an appliance of the type described forming a unitary article of furniture and including in combination a cabinet; a sink and stove supported on the top wall of said cabinet in juxtaposed position and in substantially the same horizontal plane; a pair of panels slidably mounted at opposite ends of said cabinet; means for slidably moving said panels upward to a vertical position at each end of the top wall of the cabinet and then pivotally toward each other and downward to a horizontal position overlying respectively the sink and the top of the stove, said panels in the last-named position substantially covering the top of said cabinet and constituting a worktable top; and means for independently withdrawing the panel covering the top of the stove from said cabinet and adjusting said panel in an angular position relative to the top of said stove, said panel serving in said position as a drainboard for the sink.

10. In an appliance of the type described having water-supply means thereon, a frame having side, rear, bottom and top walls; a vertical partition disposed within said cabinet intermediate the side walls thereof and forming a pair of compartments; a burner box including a plurality of burners supported on the top of one of said compartments; a sink constituted by a recess in the top wall of the cabinet at the top of the other compartment and lying in substantially the same horizontal plane as the burners of said shown in dotted lines in Fig. 3 by merely pulling the carriage 53 upward until the pivot connection 54 is exposed. This will allow the panel, as it is pivotally connected to the carriage by means of the link bar 52, to assume the angular position shown in broken lines in Fig. 3.

In this position, as will be seen, the end of the panel adjacent the side of the cabinet will be elevated and the opposite end will project over the rim or edge of the sink. The panel in this position functions as a drainboard for the sink, and, as the same slopes toward the latter, water or other liquids will be carried down the panel and discharged into the sink as in the conventional drainboard.

To prevent liquids from spilling over the edges of the panel, the same as shown is provided with a lip 43a extending about the three sides thereof.

To hold the panel 43 in the elevated position shown, the pivot connection 54 is provided with a stop 58 which limits the pivotal movement of the link with respect to the carriage 53. The stop 58 holds the panel in the desired angular position relative to the top of the cabinet but will not interfere with the pivotal movement of the panel.

To prevent the weight of articles placed on the drainboard in the elevated position from urging the carriage downward, a leaf spring 59 having one end rigidly secured to the carriage is provided with an offset portion 60 which forms a detent when the carriage is moved to the limit of its upward travel on the trackway.

The detent 62, as the carriage reaches the upper limit of its travel, rides over a shoulder 61 formed on the inner face of the wall 12 and holds the carriage in its uppermost position. The carriage may be moved downwardly by an application of force sufficient to cause the spring to move inwardly and permit the offset portion to clear the shoulder 61.

The panel 43 is provided on the underneath surface thereof with a metallic pad 64 which, when the panel is in the position shown in the dotted lines in Fig. 3, lies directly over one of the burners of the burner box. This pad preferably is provided with a bottom face formed to distribute heat over the entire undersurface of the panel 43 upon the ignition of the burner which it overlies. The pad 64, when the panel is supported in the position shown in Fig. 3, lies a sufficient distance above the burner to insure an ample supply of secondary air to the burner. This prevents the formation of any carbon monoxide gas which might be formed if insufficient secondary air was not furnished the burner ignited.

With the panel supported, as shown in dotted lines in Fig. 3, the same may be used as a dish or culinary vessel drier as the same will be heated by the burner and convection currents rising from the panel will dry dishes, culinary vessels or the like supported by the panel.

It will be seen that the appliance of the present invention affords practically all of the facilities of a modern kitchen, and, as these facilities are all housed within a single cabinet, their conjoint or successive use is rendered very convenient. A housewife or the like, for example, in the preparation of a meal may, if necessary, commence the preparation of the meal on the table provided by the appliance when the panels are in the position shown in Fig. 2. She may then, after moving the panels to the position shown in heavy lines in Fig. 3, expose the sink and stove for use. She can then, for example, clean and wash vegetables in the sink and deposit them in a culinary vessel stored within the drawer and place them on the stove or in the oven or broiler for cooking without the necessity of the numerous steps now required to complete this operation.

After the meal has been eaten, the dirty dishes and culinary vessels may be placed in the sink where they may be washed and then placed on the combined drainboard and drier for drying preparatory to subsequent storage either within the cabinet or other storage space.

The appliance of the present invention is particularly adapted for use in small kitchens such as found in small houses or apartment dwellings where the floor space in the kitchen is limited. The cabinet may be installed for complete use within a suitable compartment of a size only sufficient to allow the cabinet to be placed therein and other kitchen equipment such as storage cabinets or an ice box may be placed directly against the side walls thereof and not interfere in any way with the use of the facilities afforded by the cabinet.

Variations and modifications may be made within the scope of this invention and portions of the improvements may be used without others.

I claim:

1. In an appliance of the type described, a cabinet having side, rear, bottom, and top walls; a burner assembly underlying an aperture in the top wall of said cabinet; a sink constituted by a recess in the remaining portion of the top wall and disposed in substantially the same horizontal plane as said burner assembly; a pair of panels pivotally associated with the top wall of the cabinet; means for horizontally positioning said pair of panels conjointly and successively and for withdrawing said panels conjointly and successively from said overlying positions; and means for adjusting the panel overlying the burner assembly so that the outer edge thereof is disposed at a level higher than the inner edge and serving in this adjusted position as a drainboard for the sink.

2. In an appliance of the type described forming a unitary article of furniture and including in combination a cabinet; a sink supported in the upper and side portion of the cabinet; a burner assembly supported in the upper opposite side portion of the cabinet; a pair of panels each slidable vertically in apertures formed adjacent the opposite end walls of the cabinet; means for pivotally moving said panels when fully withdrawn from said apertures toward each other and then downwardly to horizontal positions overlying respectively the sink and burner assembly; and means for further adjusting the panel overlying the burner assembly so that the outer edge thereof is disposed at a higher level than the inner edge and serving in this adjusted position as a drainboard for the sink.

3. An appliance of the type described forming a unitary article of furniture and including in combination a cabinet; a sink supported in the upper and side portion thereof; a burner assembly including a plurality of spaced burners supported in the upper opposite side portion of said cabinet; a horizontal table portion covering the sink and burner assembly, said table portion comprising a pair of independently movable panels pivotally associated with said cabinet; means for moving said panels pivotally from horizontal positions to vertical positions and then slidably downward to lie in vertical planes substantially parallel to the side walls of the cabinet; and means for adjusting the panel overlying said burner box, said sink being positioned to cooperate with the water-supply means; a pair of panels mounted to slide in spaced parallel vertical planes on opposite sides of the cabinet, said panels being slidably moved to a vertical position and then pivotally downward to a horizontal position overlying the sink and burners respectively, said panels in this position forming a table top coextensive with the top wall of said cabinet, and means for further adjusting the panel covering the burners in an angular position relative to the top wall of the frame, said panel serving in said position as a drainboard for the sink.

11. In an appliance of the type described forming a unitary article of furniture and including in combination a cabinet having a pair of vertically disposed compartments therein; a sink supported at the top of one of said compartments; a burner box including a plurality of burners supported at the top of the other compartment, the burners of said box lying in substantially the same horizontal plane as said sink; trackways formed within said cabinet at opposite sides thereof; a carriage having anti-friction means operating in each of said trackways; a panel pivotally connected to each of said carriages, said panels being concealed within said cabinet when the carriages are at the lower end of said trackways; means for withdrawing said panels from the cabinet when the carriages are moved upwardly on said trackways to a position where the pivotal connection of each panel to its respective carriage is exposed, and for pivotally moving the panels respectively upon exposure of said pivotal connections toward each other and then downward to a horizontal position overlying respectively the sink and burners of the burner box, and means for adjusting the panel overlying the burners in an angular position relative to the top of said cabinet, said panel forming in said position a drainboard for the sink.

12. In an appliance of the type described forming a unitary article of furniture and including in combination a cabinet having a pair of vertically disposed compartments therein; a sink supported at the top of one of said compartments; a burner box including a plurality of burners supported at the top of the other compartment, the burners of said box lying in substantially the same horizontal plane as said sink; a trackway disposed within said cabinet on the side thereof adjacent the burner box; a carriage movably mounted on said trackway, a panel within said cabinet; a link member pivotally interconnecting said carriage and panel, the panel being slidably movable upward of said trackway to a position where the pivotal connection between said panel and the link is exposed at the top of the cabinet, whereupon said panel may be pivotally moved downward to a horizontal position overlying the burners of the burner box, said panel adapted to be moved to a position wherein the pivotal connection between the link member and the carriage is exposed whereupon the link member may be pivotally moved downward to angularly position the panel over the burner box; and a stop means carried by said second pivotal connection for limiting the pivotal movement downward of said link and for holding said link in an angular position relative to the top of said burner box, whereby said panel is supported above said burner box with the outer end thereof in an elevated position and the opposite end thereof projecting over the rim edge of said sink.

13. In an appliance of the type described forming a unitary article of furniture and including in combination a cabinet; a sink and stove in the upper portion of said cabinet in juxtaposed position and in substantially the same horizontal plane; a trackway concealed within said cabinet adjacent said stove; a panel slidably mounted on said trackway for vertical movement from a concealed position within said cabinet to an exposed position; means for pivotally moving said panel from the exposed vertical position to a horizontal position overlying the stove, in which position the panel is substantially coextensive with the top of the stove; and means for further moving and adjusting said panel in a position wherein one end thereof is in an elevated position, the opposite end projecting over the rim of the sink so that liquids deposited on the panel in this position will be carried to the sink.

14. In an appliance of the type described forming a unitary article of furniture and including in combination a cabinet; a sink and stove in the upper portion of said cabinet in juxtaposed position and in substantially the same horizontal plane; a vertically disposed trackway concealed within said cabinet adjacent the stove; a carriage movably mounted on said trackway; a panel housed within said cabinet; a link pivotally interconnecting said carriage and panel, the carriage permitting the panel to be easily moved upward from a concealed position within the cabinet to an exposed position, the pivotal connection between the panel and said link permitting the panel to be pivotally moved downward from its vertical exposed position to a horizontal position overlying the stove, in which position the panel is substantially coextensive with the top of the stove, the panel being movable from its horizontal position to an angular position overlying the stove by continuing the movement of the carriage to the upper end of the trackway to expose the pivotal connection between the link and the same; and stop means associated with the pivotal connection between the link and the carriage for limiting the pivotal movement of the link for holding and supporting the panel with the end opposite the sink elevated so that liquid deposited on said panel will be carried to the sink.

15. In an appliance of the type described forming a unitary article of furniture and including in combination a cabinet; a sink and stove in the upper portion of said cabinet in juxtaposed position and in substantially the same horizontal plane; a vertically disposed trackway concealed within said cabinet adjacent the stove; a carriage movably mounted on said trackway; a panel housed within said cabinet; a link pivotally interconnecting said carriage and panel, the carriage permitting the panel to be easily moved upward from a concealed position within the cabinet to an exposed position, the pivotal connection between the panel and said link permitting the panel to be pivotally moved downward from its vertical exposed position to a horizontal position overlying the stove, in which position the panel is substantially coextensive with the top of the stove, the panel being movable from its horizontal position to an angular position overlying the stove by continuing the movement of the carriage to the upper end of the trackway to expose the pivotal connection between the link and the same; and means carried by the carriage cooperable with means on the trackway, when the carriage has been moved to its upper position on the trackway, for releasably holding the carriage in the same position.

16. In an appliance of the type described forming a unitary article of furniture and including in combination a cabinet; a sink and a burner box including a plurality of spaced burners in the upper portion of said cabinet in juxtaposed position and in substantially the same horizontal plane; a trackway concealed within said cabinet adjacent said stove; a panel slidably mounted on said trackway for vertical movement from a concealed position within said cabinet to an exposed position, said panel being adapted to be pivotally moved from the exposed vertical position to a horizontal position overlying the stove, in which position the panel is substantially coextensive with the top of the stove, said panel adapted to be further moved to a position wherein one end thereof is in an elevated position, the opposite end projecting over the rim of the sink so that liquids deposited on the panel in this position will be carried to the sink; retractable means for supporting the outer end of said panel in elevated position; and means carried by the underside of said panel for receiving and directing heat from one of said burners over the underside of the panel to heat the same so that articles supported by said panel will be heated and dried.

17. In an appliance of the type described having water-supply means, a frame having side, rear, bottom and top walls; a vertical partition disposed within said cabinet intermediate the side walls thereof and forming a pair of compartments; a burner box including a plurality of burners supported on the top of one of said compartments, a sink at the top of the other compartment to cooperate with the water-supply means and lying in substantially the same horizontal plane as the burners of said burner box; a pair of panels mounted to slide in spaced parallel vertical planes on opposite sides of the cabinet; means for moving said panels slidably to a vertical position and then pivotally downward to a horizontal position overlying the sink and burners respectively, said panels in this position forming a table top coextensive with the top wall of said cabinet, and means for moving the panel overlying the burners to an angular position relative to the top of said cabinet, said panel forming in said position a drainboard for the sink.

DONALD G. STRACHAN.

CERTIFICATE OF CORRECTION.

Patent No. 2,222,960. November 26, 1940.

DONALD G. STRACHAN.

It is hereby certified that error appears in the printed specification of the above numbered patent requiring correction as follows: Page 3, second column, line 36, claim 1, after "successively" insert --to overlie respectively the sink and burner assembly,"; page 4, second column, line 17, claim 7, after "therefrom" insert a semicolon; line 34-35, claim 8, for "with in" read --within--; page 5, first column, lines 9 and 39, and page 6, second column, line 22, claims 10, 11, and 17 respectively, strike out the comma and insert instead a semicolon; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.